(No Model.) 3 Sheets—Sheet 1.

P. GOLDSMITH.
COMBINED BICYCLE SUPPORT AND PACKAGE CARRIER.

No. 581,550. Patented Apr. 27, 1897.

WITNESSES
William A. Swert
Charles S. Brintnall

INVENTOR
Paul Goldsmith
by W. E. Hagan
atty (No Model.) 3 Sheets—Sheet 2.

P. GOLDSMITH.
COMBINED BICYCLE SUPPORT AND PACKAGE CARRIER.

No. 581,550. Patented Apr. 27, 1897.

WITNESSES
William A. Swett
Charles S. Brintnall

INVENTOR
Paul Goldsmith
by W. E. Hagan
Atty (No Model.) 3 Sheets—Sheet 3.
P. GOLDSMITH.
COMBINED BICYCLE SUPPORT AND PACKAGE CARRIER.
No. 581,550. Patented Apr. 27, 1897.
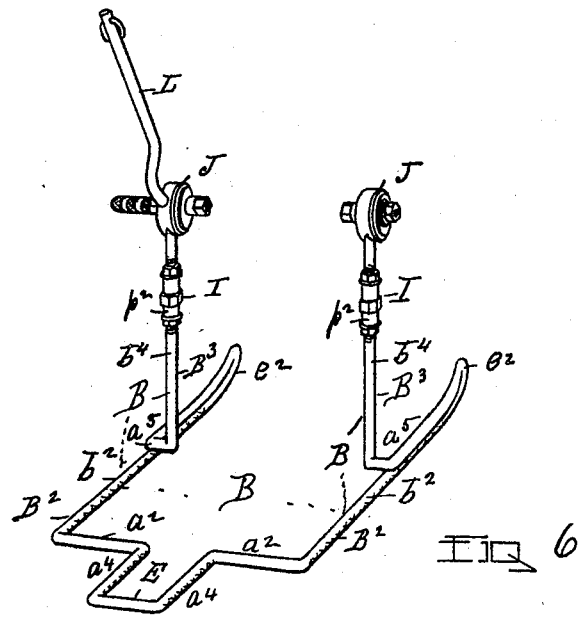
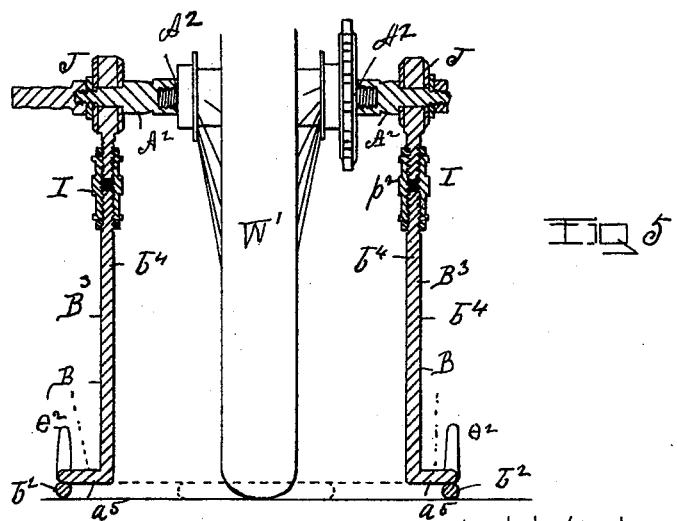
WITNESSES
William A. Swert
Charles S. Bristnall
INVENTOR
Paul Goldsmith
by W. E. Hagan
Atty

UNITED STATES PATENT OFFICE.

PAUL GOLDSMITH, OF TROY, NEW YORK.

COMBINED BICYCLE-SUPPORT AND PACKAGE-CARRIER.

SPECIFICATION forming part of Letters Patent No. 581,550, dated April 27, 1897.

Application filed January 27, 1897. Serial No. 620,923. (No model.)

*To all whom it may concern:*

Be it known that I, PAUL GOLDSMITH, of the city of Troy, county of Rensselaer, and State of New York, have invented a new and useful Combined Bicycle-Support and Package-Carrier, of which the following is a specification.

My invention relates to an attachment to bicycles which can be operated to sustain the latter in a perpendicular position when the rider is mounting or dismounting, and by which attachment the driving-wheel may be raised from off the ground, with the bicycle retained in a perpendicular position for practicing pedaling, and which attachment as operated by the rider will prevent the latter from falling from the tipping of the bicycle, and which attachment can be operated to sustain the bicycle in a perpendicular position and act as a brake to prevent its retrograding when the rider is ascending a hill and desires to rest without dismounting, and which attachment when not in use for either of the before-named functions may be employed as a receptacle for packages.

Accompanying this specification to form a part of it there are three plates of drawings containing six figures illustrating my invention.

Figure 1:
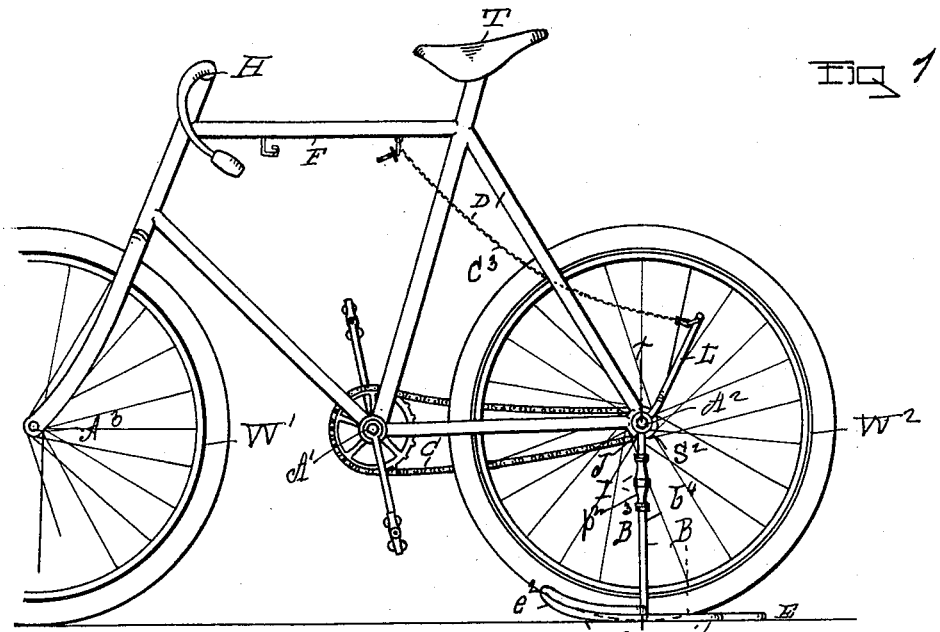
Figure 2:
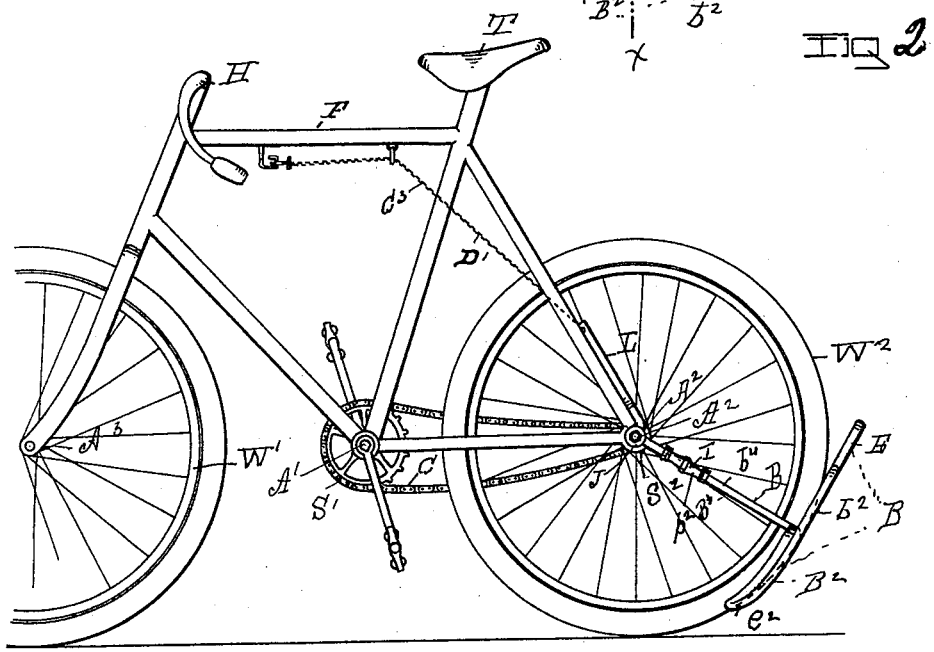
Figure 3:
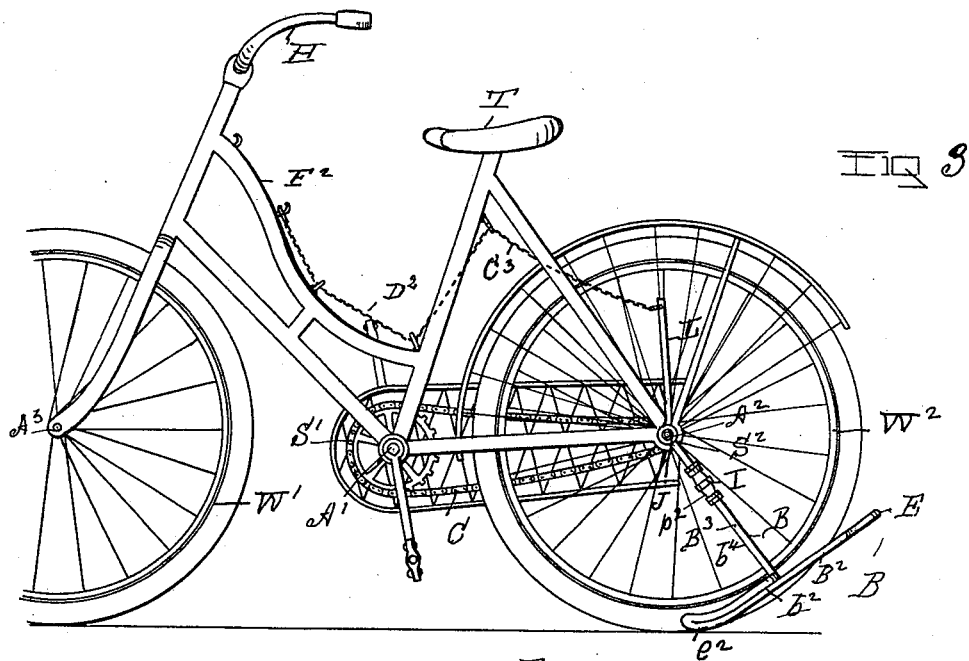
Figure 4:
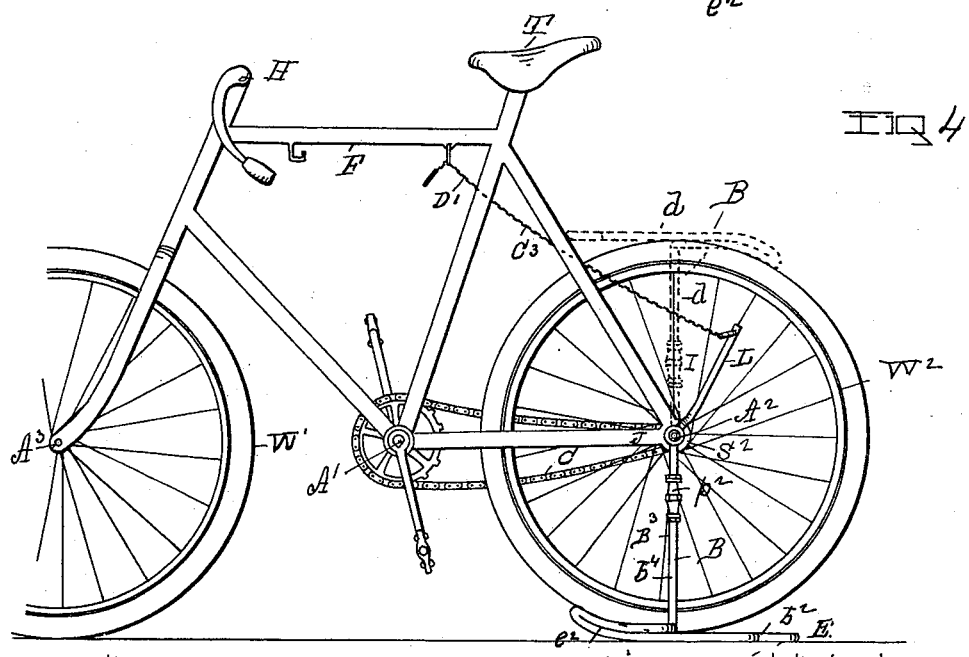

Of the illustrations, Figure 1 is a side elevation of a bicycle for men's use, shown with my attachment applied thereto and in a position to support the bicycle in a vertical position for mounting. Fig. 2 is a side elevation of the bicycle shown at Fig. 1 with the attachment moved away from contact with the ground. Fig. 3 shows in a side elevation my attachment applied to a bicycle designed for the use of females and illustrating a modified arrangement of the chain used to operate the attachment, with the latter shown in a position to act as a brake or drag, as well as to prevent the bicycle from tipping. Fig. 4 is another side elevation of the bicycle illustrated at Figs. 1, 2, and 3, with the attachment as shown in a position with the driving-wheel raised from off the ground and in a position for pedal practice and with the attachment illustrated as swung up over the driving-wheel back of the rider's seat, in which position it may be used as a package-carrier, and in which condition it is represented by a dotted line. Fig. 5 is a rear end view of the bicycle, showing the driving-wheel in part and the hub and spur-wheel in elevation, with the driving-wheel axle and my attachment shown in vertical section, taken on the line $x\ x$ of Fig. 1, with the parts shown in a larger size than in the latter. Fig. 6 is a perspective of the apparatus shown as detached from the bicycle.

The several parts of the attachment and the bicycle parts with which it connects as thus illustrated are designated by letter reference, and the function of the parts is described as follows:

The letters $W'$ designate the front wheel, and $W^2$ the driving-wheel; $A'$, the pedal-axle; $A^2$, the driving-wheel axle, and $A^3$ the axle of the front wheel. The letter $S'$ designates the sprocket-wheel on the pedal-axle; $S^2$, the sprocket spur-wheel on the driving-wheel axle; C, the sprocket-chain belt; T, the rider's seat; H, the guiding-arms, all of which are of the usual form.

The attachment constituting my invention consists (as will be more fully detailed in the claims) of a frame B, provided with two parallel bars, each having projected from a point near its center and at right angles thereto another bar, each of which latter at its end, where opposite to that connecting with the parallel bars, is journaled onto the axle of the driving-wheel, where projecting outwardly beyond the latter, and on which connection the journaled bars and the connected parallel bars can be swung downwardly to rest upon the ground at each side of the driving-wheel, or swung up away from the ground to act as a brake, or to still farther swing up, so as to be over the driving-wheel back of the rider's seat, to be used as a package-carrier.

The letters $b^2\ b^2$ designate the side bars of the frame part $B^2$, and they are arranged to be parallel to each other in the same plane and at a sufficient distance apart to give in combination with the other connected parts a broad bearing on the ground when the frame is used as a support to sustain the bicycle in a vertical position and with the frame side bars resting on the ground at each side of the driving-wheel. These side bars $b^2$ are extended at one of their ends (and that one of the latter which, when the frame is resting on the ground, is their rear ends) to approach each other at right angles, as indicated at $a^2$, and wherefrom they are extended and continued rearwardly at $a^4$ to produce the end-inclosed rectangular recess E. By forming this recess in the end of the frame part $B^2$ the latter can be extended rearwardly a sufficient distance to have a proper measure of ground-bearing support, with the recess furnishing a passage-way for the driving-wheel when the frame B is swung up rearwardly, as shown at Fig. 3. These side-bar parts of the frame part $B^2$ (designated at $b^2$) are upcurved at the open end of the frame part of which they form a part, and from where thus upcurved they are by a return-bend in the material of which they are made carried inwardly over and upon that part of said side bars $b^2$ which rests upon the ground when in position as shown at Figs. 1 and 4, with this return-bend and top extension of these side bars continued until about the middle part of the frame part $B^2$, wherefrom as integrally formed these side bars are bent inwardly at right angles at $a^5$ and then again bent at right angles to this inward extension at $a^5$ and to the side bars $b^2$, by which there is formed the frame part $B^3$, the latter consisting of the bars $b^4$ $b^4$, each of which at its end opposite to that connecting with the angular extension $a^5$ is extended at right angles to the latter, and the side bars $b^2$, to connect with one of the journal-boxes J J, located to turn on the driving-wheel axle, where the latter extends outwardly beyond the wheel.

As thus constructed the frame B can on its journaled connection with the driving-wheel axle be operated to swing down onto the ground to support the bicycle in a vertical position, with the frame part $B^2$ resting upon the ground, as illustrated at Figs. 1 and 4, or in still another position, as shown at Fig. 3, with the frame acting as a brake, or with the frame swung up over the driving-wheel back of the rider's seat, as indicated by the dotted line $d$ at Fig. 4, in which latter position the frame is adapted to have packages strapped thereto.

The letter L designates a crank-arm connecting with one of the journal-boxes J, to which latter there is also connected one of the bars $b^4$, and the letters $C^3$ designate a chain connecting with the outer end of said crank-arm and also with the frame F of the bicycle, as shown at D', Figs. 1 and 2, and at $D^2$ at Fig. 3, by the operation of which chain the rider is enabled to place the frame B in position as before described. As thus constructed and arranged to be operated, when the rider desires to use the frame as a brake or drag the chain is used to put the frame in the position shown at Fig. 3, in which position it also prevents the bicycle from tipping. When the rider is moving up hill and desires to rest without dismounting, the frame is by the chain put in the position shown at Fig. 3, when by a reverse movement of the pedals the frame is brought in the position shown at Fig. 1, which is the same position into which the frame is placed in mounting and dismounting and it is desired to have the bicycle in a vertical position. When used for pedaling, the wheel $W^2$ is raised from the ground into the position shown at Fig. 4. When riding and the rider is unable to keep the bicycle in a vertical position and is in danger of falling, the frame may be brought into the position shown at Fig. 3, which will prevent the bicycle from tipping.

The letters I designate a right and left hand threaded connection by which the bar-piece $p^2$ may be used to lengthen or shorten the bars $b^4$ of the frame part $B^3$ to adapt the attachment to bicyles of differing heights. If desired, the bottom of the upturned surface of the end parts $e^2$ $e^2$ of the side bars $b^2$ may be covered with rubber or cross-grooved to make a stronger frictional engagement with the ground. Preferably the side-bar parts $b^4$ and the parts $b^2$ $b^2$ are integrally formed, although I do not limit my invention to their production in this manner, as they may be differently made and perform the same function in the same manner.

Having thus described my invention, what I claim, and desire to secure by Letters Patent, is—

1. The combination with a bicycle of a frame having two side bars, arranged to be parallel to each other, with the side-bar ends at one end of the frame disconnected, and slightly upcurved, with the other ends of the side bars rectangularly connected to form a rectangular end recess; a bar connecting with each of said side bars at right angles thereto, near its center, and at its other end, connecting with a journal-box arranged to turn on the driving-wheel axle at each end of the latter, where extending beyond the wheel; a crank-arm on one of said journal-boxes, and a chain connecting with said crank-arm and with the bicycle-frame, constructed and arranged to operate substantially in the manner as, and for the purposes set forth.

2. The combination in a bicycle attachment of the frame B, having the side bars $b^2$, $b^2$, connected to form the rectangular inclosure E', at one of its ends, and having the upcurved ends $e^2$, at the other end; the bars $b^4$, $b^4$, each rectangularly connected at one of its ends to one of said side bars near its center; the journal-boxes J, J, each arranged to turn on the driving-wheel axle outside of the driving-wheel, and to connect with one of said bars $b^4$, at its end opposite to that connecting with the side bar $b^2$; the crank-arm L, connecting with one of said journal-boxes; and the chain $C^3$, connecting with one of said journal-boxes, and the bicycle-frame, constructed and arranged to be operated, substantially in the manner as, and for the purposes set forth.

3. The combination with the driving-wheel axle of a bicycle, of a journal-box J, arranged on each end of the axle outside of the driving-wheel; a frame part B³, at one of each of its ends connecting with one of said journal-boxes; the frame part B², connecting at right angles with the bars of the frame parts B³, the crank-arm L, connecting with one of said journal-boxes; and the chain C³, connecting with said crank-arm, and with the bicycle-frame constructed and arranged to be operated substantially in the manner, as and for the purposes set forth.

4. In an attachment to bicycles having a driving-wheel axle projecting outwardly beyond the latter at each side thereof; the combination with a journal-box arranged to turn on said axle at each of its ends; of a frame part connected with each of said journal-boxes, and therefrom extended to connect at right angles with two parallel side bars arranged in the same plane, and angularly connected at one of their adjacent ends to form an outwardly-projecting rectangular recess, and each of said side bars at its other end slightly upcurved; a crank-arm connecting with one of said journal-boxes; and a chain attached to the outer end of said crank-arm whereby said frame may be operated substantially in the manner as and for the purposes set forth.

Signed at the city of Troy, New York, this 4th day of December, 1896, in the presence of the two witnesses whose names are hereto written.

PAUL GOLDSMITH.

Witnesses:
W. E. HAGAN,
CHARLES S. BRINTNALL.